(12) United States Patent
Yanagita

(10) Patent No.: US 11,522,699 B2
(45) Date of Patent: Dec. 6, 2022

(54) INFORMATION PROCESSING SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Hiroshi Yanagita, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 134 days.

(21) Appl. No.: 17/023,322

(22) Filed: Sep. 16, 2020

(65) Prior Publication Data
US 2021/0266165 A1  Aug. 26, 2021

(30) Foreign Application Priority Data
Feb. 21, 2020  (JP) .............................. JP2020-028308

(51) Int. Cl.
*H04L 9/32* (2006.01)
*H04L 9/08* (2006.01)
*H04L 9/40* (2022.01)

(52) U.S. Cl.
CPC ............ *H04L 9/321* (2013.01); *H04L 9/0861* (2013.01); *H04L 9/0894* (2013.01); *H04L 63/0876* (2013.01)

(58) Field of Classification Search
CPC ... H04L 9/321; H04L 9/32; H04L 9/08; H04L 9/0861; H04L 9/0894; H04L 9/0876;
(Continued)

(56) References Cited

U.S. PATENT DOCUMENTS

2006/0282680 A1* 12/2006 Kuhlman ................ G06F 21/32
                                                              713/186
2017/0048218 A1*  2/2017 Lindemann ......... H04L 63/0823
(Continued)

FOREIGN PATENT DOCUMENTS

JP          2018205906           12/2018

*Primary Examiner* — Shaqueal D Wade-Wright
(74) *Attorney, Agent, or Firm* — JCIPRNET

(57) ABSTRACT

An information processing system includes a first authentication terminal for authenticating a first user, a second authentication terminal for authenticating a second user, a device for authenticating the device, and an authentication server that performs authentication using a registered authentication function. The authentication server registers an authentication function of the first authentication terminal based on an operation of the first user. When authentication using the first authentication terminal is requested through the device, the authentication server authenticates the first user and registers an authentication function of the device. When registration of an authentication function of the second authentication terminal is requested through the device, the authentication server registers the authentication function when the authentication function of the device has been registered. When authentication using the second authentication terminal is requested, the authentication server authenticates the second user when the authentication function of the second authentication terminal has been registered.

4 Claims, 9 Drawing Sheets

(58) Field of Classification Search
CPC ... H04L 9/3236; H04L 9/3226; H04L 9/3234; H04L 9/3231; H04L 63/08; H04L 63/0876; H04L 63/0861; H04L 63/0853; H04L 63/0807; H04L 63/083; G06F 21/30; G06F 21/31; G06F 21/44; G06F 21/445; H04W 12/06
See application file for complete search history.

(56) References Cited

U.S. PATENT DOCUMENTS

| | | | |
|---|---|---|---|
| 2017/0339159 A1* | 11/2017 | Gomi | H04W 12/50 |
| 2018/0351739 A1 | 12/2018 | Ota | |
| 2020/0327219 A1* | 10/2020 | Bolimovsky | H04L 63/0861 |
| 2021/0099441 A1* | 4/2021 | Suraparaju | H04W 12/33 |

* cited by examiner

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-028308 filed Feb. 21, 2020.

BACKGROUND

(i) Technical Field

The present disclosure relates to an information processing system, an information processing apparatus, and a non-transitory computer readable medium.

(ii) Related Art

Japanese Unexamined Patent Application Publication No. 2018-205906 describes a technique in which an image processing apparatus that can communicate with a user's mobile terminal that has an authentication module for biometric authentication requests an apparatus authentication system that works together with a service providing system to issue an authentication token by using the authentication module of the mobile terminal for biometric authentication.

SUMMARY

For example, a mechanism that offers a service to a user authenticated by using a terminal registered as a terminal for authentication in an authentication server is known. In this mechanism, if terminals for authentication are registered without any restriction, a situation in which, for example, a user with malicious intent registers a large number of terminals for authentication and improperly uses the service can occur.

Aspects of non-limiting embodiments of the present disclosure relate to restricting registration of a terminal for authentication in an authentication server.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a first authentication terminal that has an authentication function of authenticating a first user, a second authentication terminal that has an authentication function of authenticating a second user, a device that has an authentication function of authenticating the device, and an authentication server that performs authentication using a registered authentication function, wherein the authentication server registers the authentication function of the first authentication terminal on a basis of an operation of the first user, when authentication using the first authentication terminal is requested through the device, the authentication server authenticates the first user and registers the authentication function of the device, when registration of the authentication function of the second authentication terminal is requested through the device, the authentication server registers the authentication function of the second authentication terminal in a case where the authentication function of the device has been registered, and when authentication using the second authentication terminal is requested, the authentication server authenticates the second user in a case where the authentication function of the second authentication terminal has been registered.

BRIEF DESCRIPTION OF THE DRAWINGS

An exemplary embodiment of the present disclosure will be described in detail based on the following figures, wherein.

DETAILED DESCRIPTION

[1] Exemplary Embodiment

Figure 1:
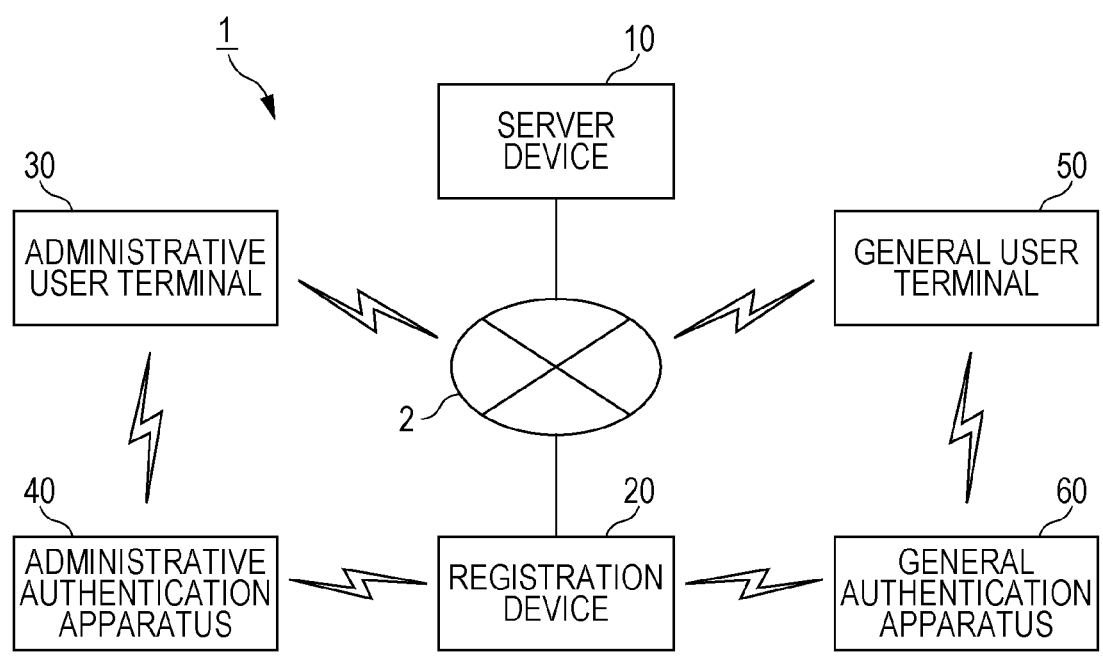
FIG. 1 illustrates an overall configuration of an authentication registration support system according to an exemplary embodiment.

FIG. 1 illustrates an overall configuration of an authentication registration support system 1 according to an exemplary embodiment. The authentication registration support system 1 is a system that performs processing for supporting registration of an authentication function and is an example of an "information processing system" of the present disclosure. The authentication function is a function of authenticating a user on the basis of information unique to the user.

A user authenticated by the authentication function is, for example, offered a service for which the user has registered himself or herself. In the authentication registration support system 1, an authentication function is also registered. A user authenticated by an authentication function that has been registered is offered a service, but a user authenticated by an authentication function that has not been registered is not offered a service.

The authentication registration support system 1 includes a communication line 2, a server device 10, a registration device 20, an administrative user terminal 30, an administrative authentication apparatus 40, a general user terminal 50, and a general authentication apparatus 60. The communication line 2 is a communication system, examples of which include a mobile communication network and the Internet, and relays data exchanged between devices that access the authentication registration support system 1. The communication line 2 is accessed by the server device 10 and the registration device 20 through wired communication and is accessed by other devices through wireless communication. Access to the communication line 2 may be wired or may be wireless.

The server device 10 performs processing related to registration of an authentication function, authentication using an authentication function, user registration, and supply of a service. The server device 10 is a device that performs authentication using a registered authentication function and is an example of an "authentication server" of the present disclosure. The registration device 20 is a device used for registration of an authentication function and is an example of a "device" of the present disclosure. The registration device 20 also has an authentication function of authenticating the registration device 20, and this authentication function is also registerable.

The administrative user terminal 30 is a terminal used by an administrative user. The administrative user is a user who administers the authentication registration support system 1 and performs operations such as registration of an authentication function. The administrative authentication apparatus 40 is a terminal that has an authentication function of authenticating the administrative user. The administrative authentication apparatus 40 has a communication effect of wirelessly communicating with the administrative user terminal 30 and the registration device 20 by P2P (Peer to Peer). The administrative user is an example of a "first user" of the present disclosure, and the administrative authentication apparatus 40 is an example of a "first authentication terminal" of the present disclosure.

The general user terminal 50 is a terminal used by a general user. The general authentication apparatus 60 is a terminal having an authentication function of authenticating a general user. The general user is a general user of the authentication registration support system 1 and performs operations such as an operation of registering himself or herself and an operation for using a service for which he or she has been registered. The general authentication apparatus 60 has a communication effect of wirelessly communicating with the general user terminal 50 and the registration device 20 by P2P. The general user is an example of a "second user" of the present disclosure, and the general authentication apparatus 60 is an example of a "second authentication terminal" of the present disclosure.

The administrative authentication apparatus 40 and the general authentication apparatus 60 have an authentication function of performing biometric authentication or the like using a fingerprint, an iris, or the like of a user. The authentication function of the authentication apparatus is not limited to biometric authentication and may be authentication such as knowledge authentication using information (e.g., a password) which only a user knows or possession authentication using an object (e.g., a token that issues a one-time password) which only a user is supposed to have.

Figure 2:
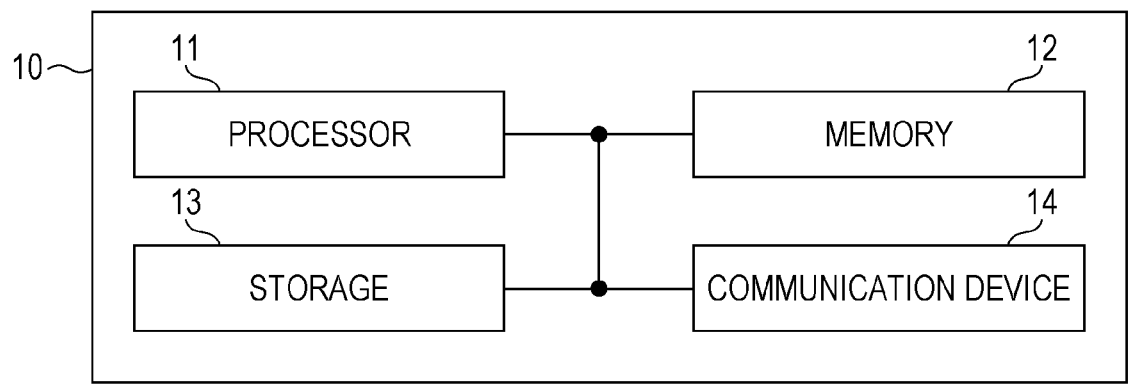
FIG. 2 illustrates a hardware configuration of a server device.

FIG. 2 illustrates a hardware configuration of the server device 10. The server device 10 is a computer that includes a processor 11, a memory 12, a storage 13, and a communication device 14. The processor 11 has, for example, an arithmetic device such as a central processing unit (CPU), a register, and a peripheral circuit. The processor 11 is an example of a "processor" of the present disclosure. The memory 12 is a recording medium that can be read by the processor 11 and has a random access memory (RAM), a read only memory (ROM), and the like.

The storage 13 is a recording medium that can be read by the processor 11 and has, for example, a hard disk drive, a flash memory, or the like. The processor 11 controls operation of hardware by executing a program stored in the ROM or the storage 13 while using the RAM as a working area. The communication device 14 is a communication unit that has members such as an antenna and a communication circuit and performs communication over the communication line 2.

Figure 3:
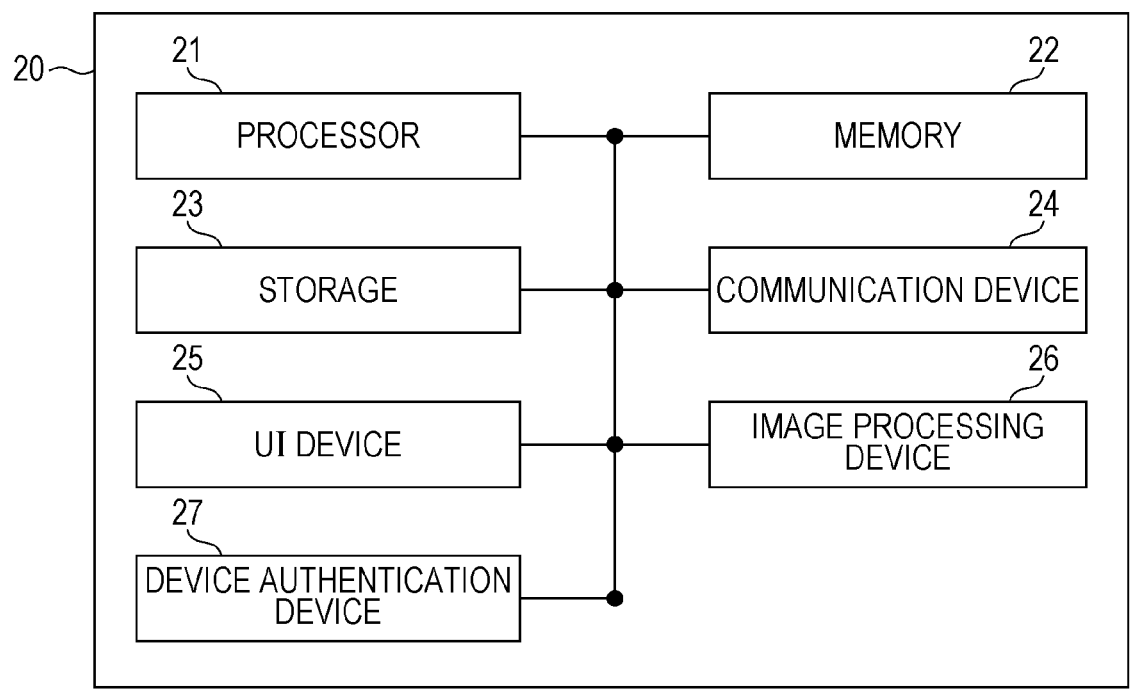
FIG. 3 illustrates a hardware configuration of a registration device.

FIG. 3 illustrates a hardware configuration of the registration device 20. The registration device 20 is a computer that includes a processor 21, a memory 22, a storage 23, a communication device 24, a UI device 25 (UI=User Interface), an image processing device 26, and a device authentication device 27. The processor 21, the memory 22, the storage 23, and the communication device 24 are hardware of the same kinds as the processor 11, the memory 12, the storage 13, and the communication device 14 illustrated in FIG. 2.

The UI device 25 is an interface offered to a user who uses the registration device 20. The UI device 25 has, for example, a touch screen that has a display and a touch panel provided on a surface of the display. The UI device 25 displays an image and receives an operation from a user. The UI device 25 has operators such as a keyboard in addition to the touch screen and receives operations on these operators.

The image processing device 26 is a device that performs image processing such as reading of an image and formation of an image. The device authentication device 27 is a device that authenticates the registration device 20. The device authentication device 27 authenticates the registration device 20, for example, by using not biometric authentication but an authentication key unique to the registration device 20 stored in advance. The authentication performed by the device authentication device 27 is not limited to authentication using an authentication key.

Figure 4:
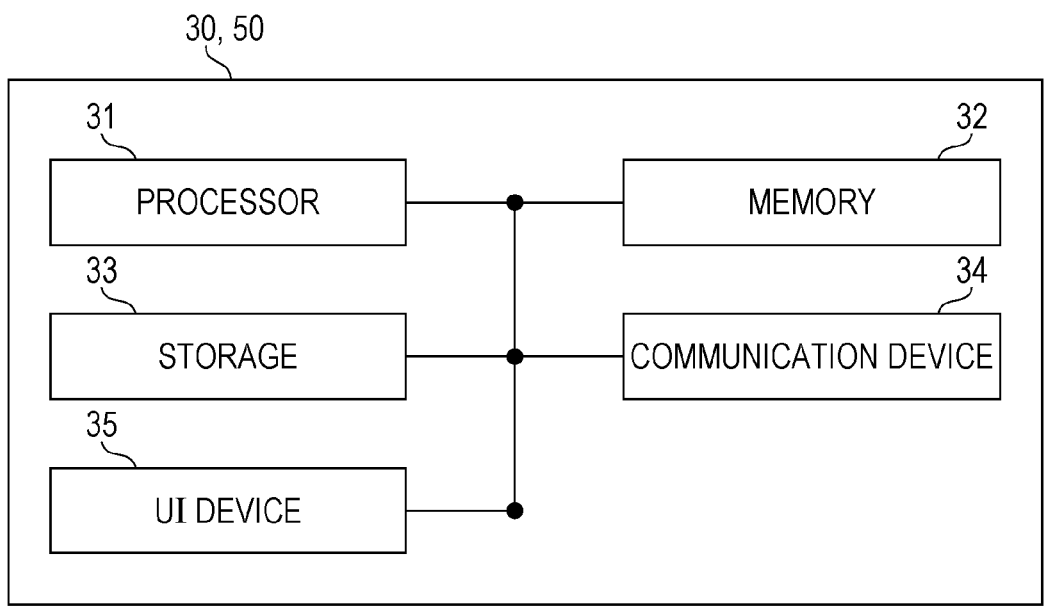
FIG. 4 illustrates a hardware configuration of a user terminal.

FIG. 4 illustrates a hardware configuration of a user terminal. The user terminal is the administrative user terminal 30 or the general user terminal 50. The user terminal is a computer that includes a processor 31, a memory 32, a storage 33, a communication device 34, and a UI device 35. The processor 31, the memory 32, the storage 33, the communication device 34, and the UI device 35 are hardware of the same kinds as the processor 21, the memory 22, the storage 23, the communication device 24, and the UI device 25 illustrated in FIG. 3.

Figure 5:
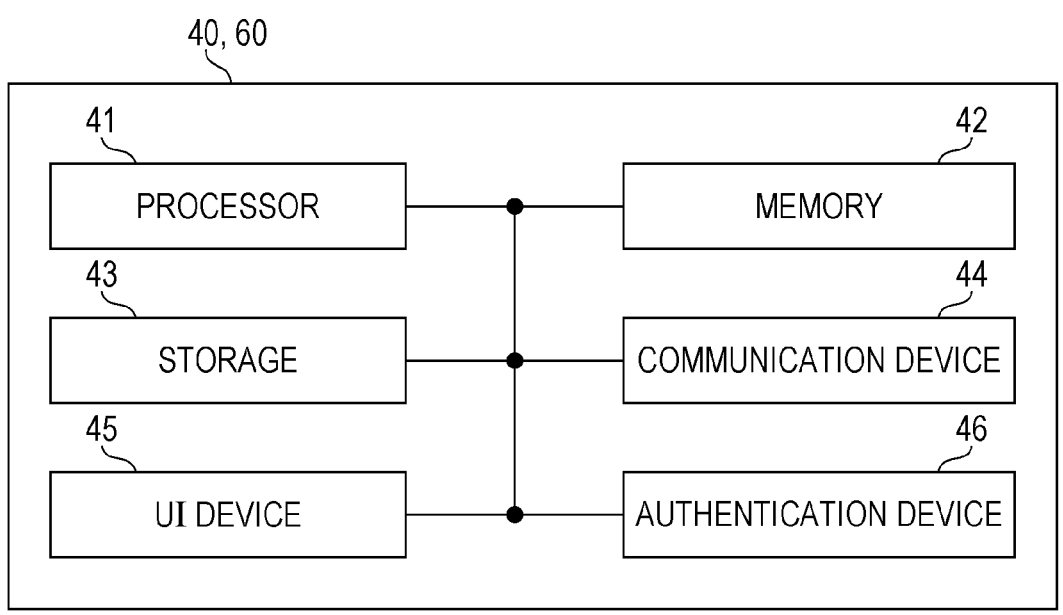
FIG. 5 illustrates a hardware configuration of an authentication apparatus.

FIG. 5 illustrates a hardware configuration of an authentication apparatus. The authentication apparatus is the administrative authentication apparatus 40 or the general authentication apparatus 60. The authentication apparatus is a computer that includes a processor 41, a memory 42, a storage 43, a communication device 44, a UI device 45, and an authentication device 46. The processor 41, the memory 42, the storage 43, the communication device 44, and the UI device 45 are hardware of the same kinds as the processor 21, the memory 22, the storage 23, the communication device 24, and the UI device 25 illustrated in FIG. 3.

The authentication device 46 is a device that realizes an authentication function described above. For example, in a case where biometric authentication is performed, the authentication device 46 detects a fingerprint, an iris, or the like and authenticates a user in a case where similarity with a pattern such as a finger or an iris of a user stored in advance is equal to or higher than a threshold value. Note that the authentication device 46 may be a device that performs authentication (e.g., knowledge authentication or possession authentication) other than biometric authentication.

In the authentication registration support system 1, the processors of the above devices control units by executing programs and thus realize functions described below. Operations performed by functions are also expressed as operations performed by the processors of the devices that realize the functions.

Figure 6:
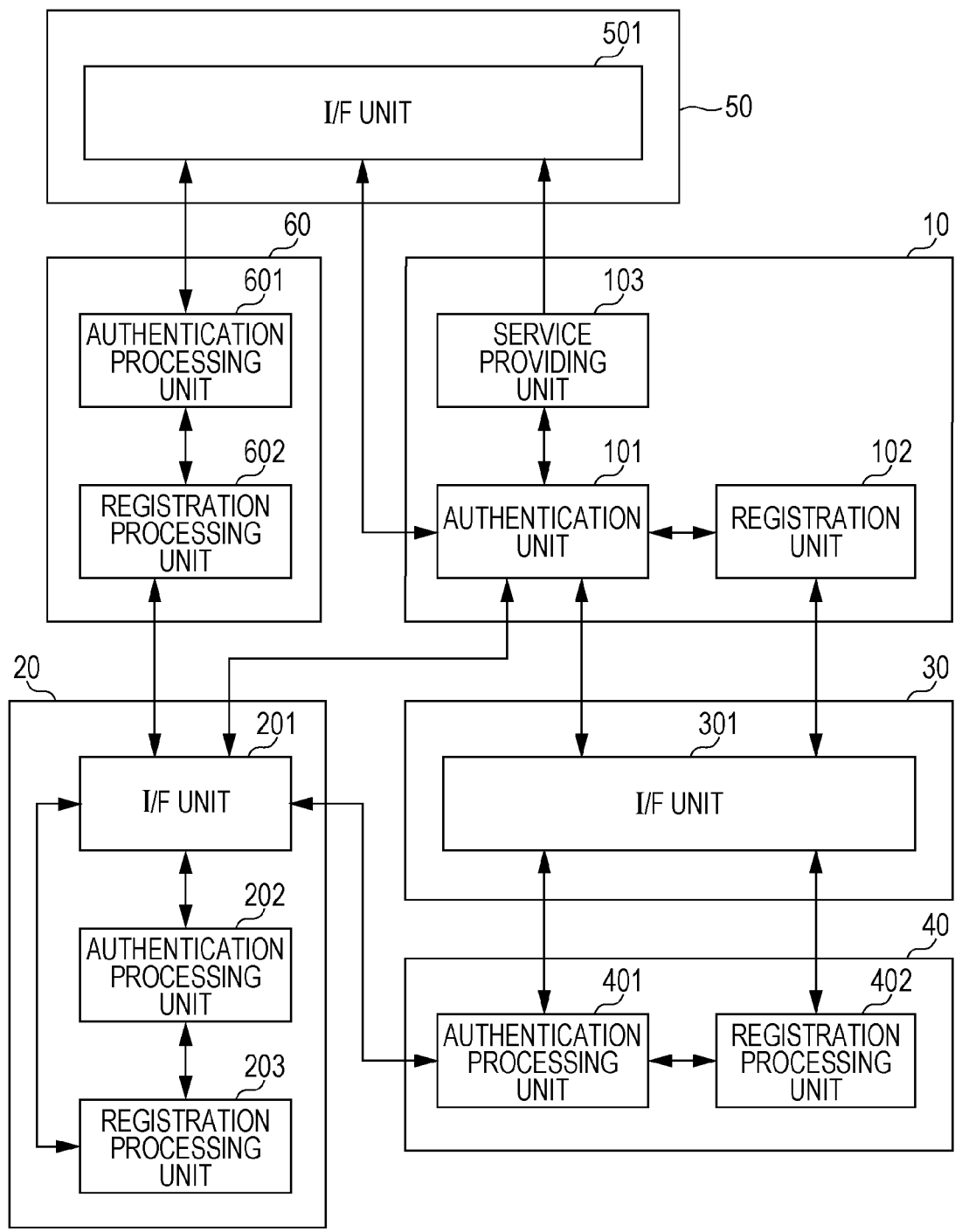
FIG. 6 illustrates a functional configuration realized in the authentication registration support system.

FIG. 6 illustrates a functional configuration realized in the authentication registration support system 1. The server device 10 includes an authentication unit 101, a registration unit 102, and a service providing unit 103.

The registration device 20 includes an I/F unit 201, an authentication processing unit 202, and a registration processing unit 203. The administrative user terminal 30 includes an I/F unit 301. The administrative authentication apparatus 40 includes an authentication processing unit 401 and a registration processing unit 402. The general user terminal 50 includes an I/F unit 501. The general authentication apparatus 60 includes an authentication processing unit 601 and a registration processing unit 602.

The I/F unit 201 of the registration device 20 displays a screen that serves as an interface for a user who uses the registration device 20 and receives an operation of the user. The I/F unit 301 of the administrative user terminal 30 displays a screen that serves as an interface for an administrative user and receives an operation of the administrative user. The I/F unit 501 of the general user terminal 50 displays a screen that serves as an interface for a general user and receives an operation of the general user. Each of these I/F units displays, for example, a browser screen as the interface screen.

The authentication processing unit 401 of the administrative authentication apparatus 40 performs authentication processing for authenticating the administrative user. The authentication processing unit 601 of the general authentication apparatus 60 performs authentication processing for authenticating the general user. Each of these authentication processing units controls the authentication device 46 illustrated in FIG. 5 to calculate similarity, for example, between biological information such as a user's fingerprint or iris and a pattern stored in advance in the administrative authentication apparatus 40 or the general authentication apparatus 60 and authenticate the user in a case where the similarity is equal to or higher than a threshold value.

The registration processing unit 402 of the administrative authentication apparatus 40 performs registration processing for registering an authentication function of the administrative authentication apparatus 40. The registration processing unit 602 of the general authentication apparatus 60 performs registration processing for registering an authentication function of the general authentication apparatus 60. Each of these registration processing units performs, as the registration processing, processing for generating an encryption key, which is a key for encrypting data, and a public key, which is a key for decrypting data encrypted by the encryption key and processing for requesting the server device 10 to register the generated public key.

The authentication processing unit 202 of the registration device 20 performs authentication processing for authenticating the registration device 20. The authentication processing unit 202 controls the device authentication device 27 illustrated in FIG. 3 to authenticate the registration device 20 by using an authentication key or the like unique to the registration device 20. The registration processing unit 203 performs registration processing for registering the authentication function of the registration device 20. The registration processing unit 203 performs, as the registration processing, processing for generating an encryption key and a public key and processing for requesting the server device 10 to register the generated public key, as with the registration processing unit 402 and the like.

The authentication unit 101 of the server device 10 authenticates the registration device 20, the administrative user, and the general user on the basis of requests from the I/F units (the I/F unit 201, the I/F unit 301, and the I/F unit 501). The registration unit 102 of the server device 10 registers the authentication functions of the registration device 20, the administrative user terminal 30, and the general user terminal 50 on the basis of requests from the I/F units.

The authentication unit 101 performs requested authentication in a case where an authentication function of a device (any of the registration device 20, the administrative user terminal 30, and the general user terminal 50) that has requested the authentication has been registered by the registration unit 102. In a case where the general user who has requested authentication through the general user terminal 50 has been authenticated, the service providing unit 103 of the server device 10 provides a service to the general user through the general user terminal 50.

According to the above configuration, the devices included in the authentication registration support system 1 perform registration supporting processing for supporting registration of an authentication function. The registration supporting processing is described with reference to FIGS. 7 through 13.

Figure 7:
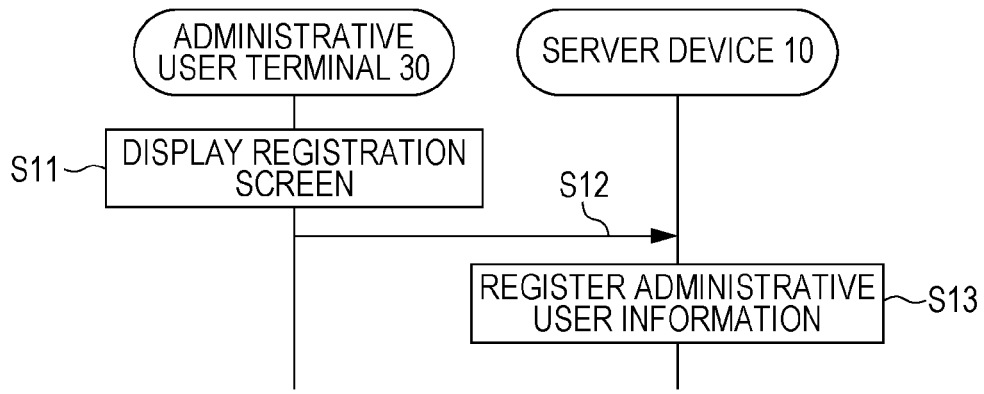
FIG. 7 illustrates an example of an operation procedure in processing for registering an administrative user.

FIG. 7 illustrates an example of an operation procedure in processing for registering the administrative user. This operation procedure is performed by the administrative user terminal 30 and the server device 10. First, the administrative user terminal 30 (the I/F unit 301) displays a registration screen for registering the administrative user (step S11).

Next, the administrative user terminal 30 (the I/F unit 301) transmits administrative user information entered on the registration screen to the server device 10 (step S12). The administrative user information is, for example, a tenant name, a user name, and a password. The tenant name is a name of a group of users who have an authority to access the server device 10. The server device 10 (the registration unit 102) registers the administrative user by storing therein the transmitted administrative user information (step S13).

Figure 8:
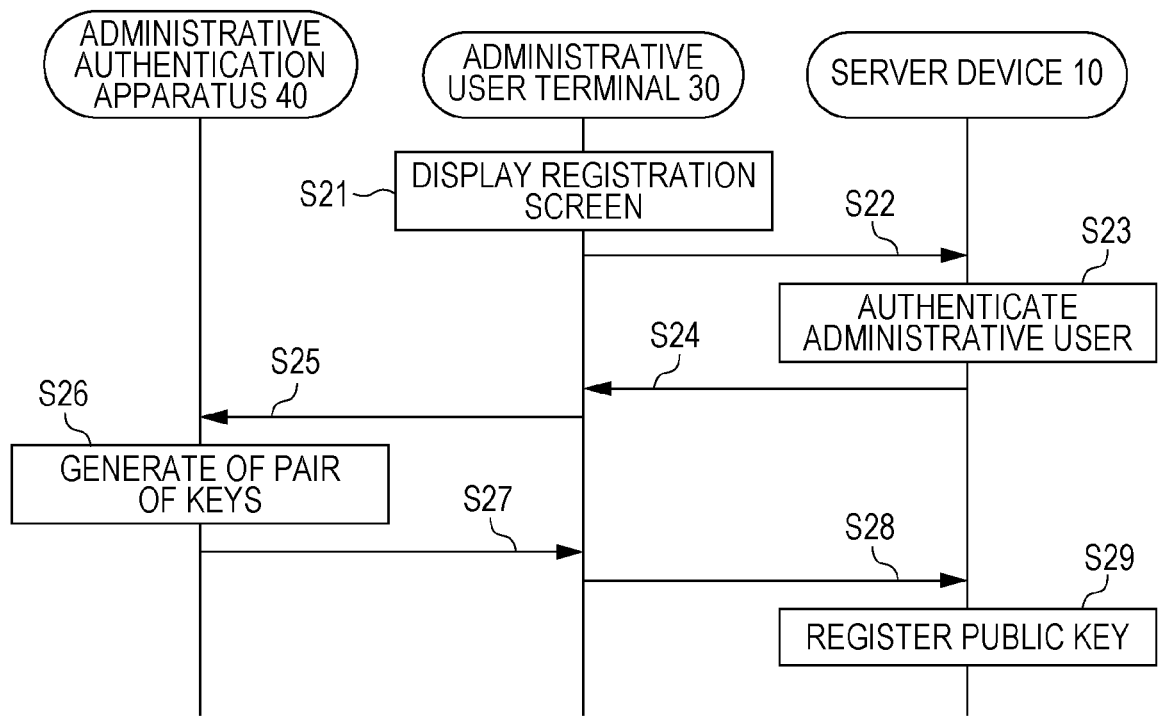
FIG. 8 illustrates an example of an operation procedure in processing for registering an administrative authentication apparatus.

FIG. 8 illustrates an example of an operation procedure in processing for registering the administrative authentication apparatus 40. This operation procedure is performed by the administrative user terminal 30, the administrative authentication apparatus 40, and the server device 10. First, the administrative user terminal 30 (the I/F unit 301) displays a screen for entry of a user name and a password of the administrative user as a registration screen for registration of the administrative authentication apparatus 40 (step S21). Next, the administrative user terminal 30 (the I/F unit 301) transmits the user name and the password entered on the registration screen to the server device 10 (step S22).

The server device 10 (the authentication unit 101) authenticates the administrative user in a case where the transmitted user name and the password have been registered (step S23). Next, the server device 10 (the registration unit 102) transmits key request data requesting a public key of an authentication apparatus of the authenticated administrative user to the administrative user terminal 30 (step S24). The administrative user terminal 30 (the I/F unit 301) transfers the transmitted key request data to the administrative authentication apparatus 40 (step S25).

The administrative authentication apparatus 40 (the authentication processing unit 401 and the registration processing unit 402) generates a pair of encryption key and public key upon receipt of the request indicated by the transmitted key request data (step S26). The encryption key is a key used to encrypt data, and the public key is a key used to decrypt data encrypted by the encryption key. The administrative authentication apparatus 40 (the authentication processing unit 401) stores therein the generated encryption key in association with identification information of the server device 10 and a user ID of the administrative user. Next, the administrative authentication apparatus 40 (the registration processing unit 402) transmits the generated public key to the administrative user terminal 30 (step S27).

The administrative user terminal 30 (the I/F unit 301) transfers the transmitted public key to the server device 10 (step S28). The server device 10 (the registration unit 102) registers the public key of the administrative authentication apparatus 40 by storing therein the transmitted public key in association with the user ID of the administrative user (step S29). By thus registering the public key, the server device 10 registers the authentication function of the administrative authentication apparatus 40 that generated the public key on the basis of an operation of the administrative user.

Figure 9:
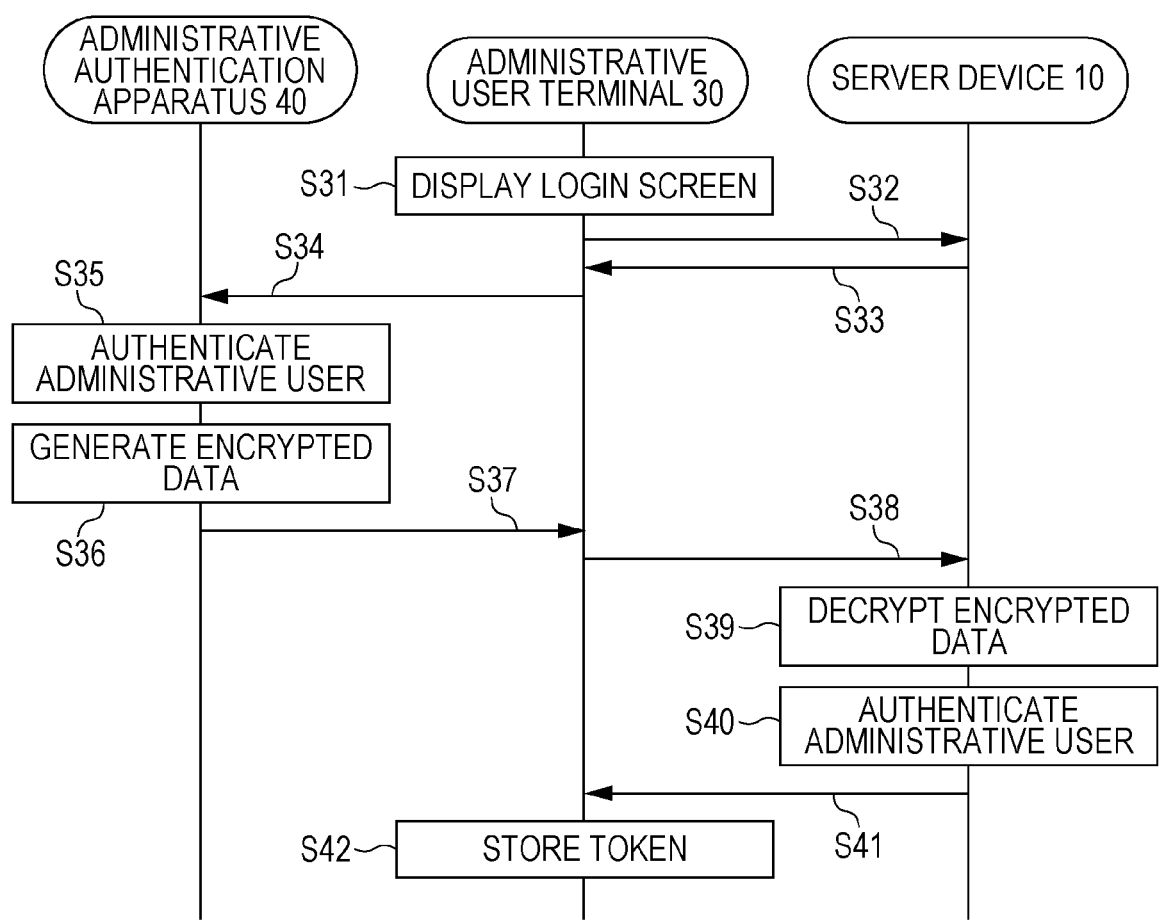
FIG. 9 illustrates an example of an operation procedure in login processing of the administrative user.

FIG. 9 illustrates an example of an operation procedure in log-in processing of the administrative user. This operation procedure is performed by the administrative user terminal 30, the administrative authentication apparatus 40, and the server device 10. First, the administrative user terminal 30 (the I/F unit 301) displays a screen for entry of the user name and the password of the administrative user as a login screen for login of the administrative user (step S31). Next, the administrative user terminal 30 (the I/F unit 301) transmits the user name and the password entered on the registration screen to the server device 10 (step S32).

The server device 10 (the authentication unit 101) authenticates the administrative user in a case where the transmitted user name and password have been registered, and transmits authentication request data that requests authentication from the authentication apparatus of the authenticated administrative user to the administrative user terminal 30 (step S33). This authentication request data includes a code that will be encrypted later. The administrative user terminal 30 (the I/F unit 301) transfers the transmitted authentication request data to the administrative authentication apparatus 40 (step S34).

The administrative authentication apparatus 40 (the authentication processing unit 401) first authenticates the administrative user in response to the request indicated by the transmitted authentication request data (step S35). For example, in a case where the administrative authentication apparatus 40 performs biometric authentication, the administrative authentication apparatus 40 (the authentication processing unit 401) reads biological information of the administrative user and, in a case where similarity with a stored pattern of biological information is equal to or higher than a threshold value, determines that the read biological information is biological information of the administrative user and therefore authenticates the administrative user.

The administrative authentication apparatus 40 (the authentication processing unit 401) that has authenticated the administrative user generates encrypted data by encrypting the code indicated by the authentication request data by using the encryption key stored therein (step S36). The administrative authentication apparatus 40 (the authentication processing unit 401) transmits the generated encrypted data to the administrative user terminal 30 (step S37). The administrative user terminal 30 (the I/F unit 301) transfers the transmitted encrypted data to the server device 10 (step S38).

The server device 10 (the authentication unit 101) decrypts the transmitted encrypted data by using the public key of the administrative authentication apparatus 40 registered in the registration processing illustrated in FIG. 8 (step S39). In a case where the encrypted data is successfully decrypted into the code, the server device 10 (the authentication unit 101) authenticates the administrative user (step S40), issues a token, and transmits the token to the administrative user terminal 30 (step S41).

The administrative user terminal 30 (the I/F unit 301) stores therein the transmitted token (step S42). The token is data indicating that the administrative user is a user who has been authenticated by the authentication apparatus. For example, in a case where the administrative user terminal 30 transmits the token to the server device 10, the server device 10 starts to provide a service that needs authentication to the administrative user terminal 30.

Figure 10:
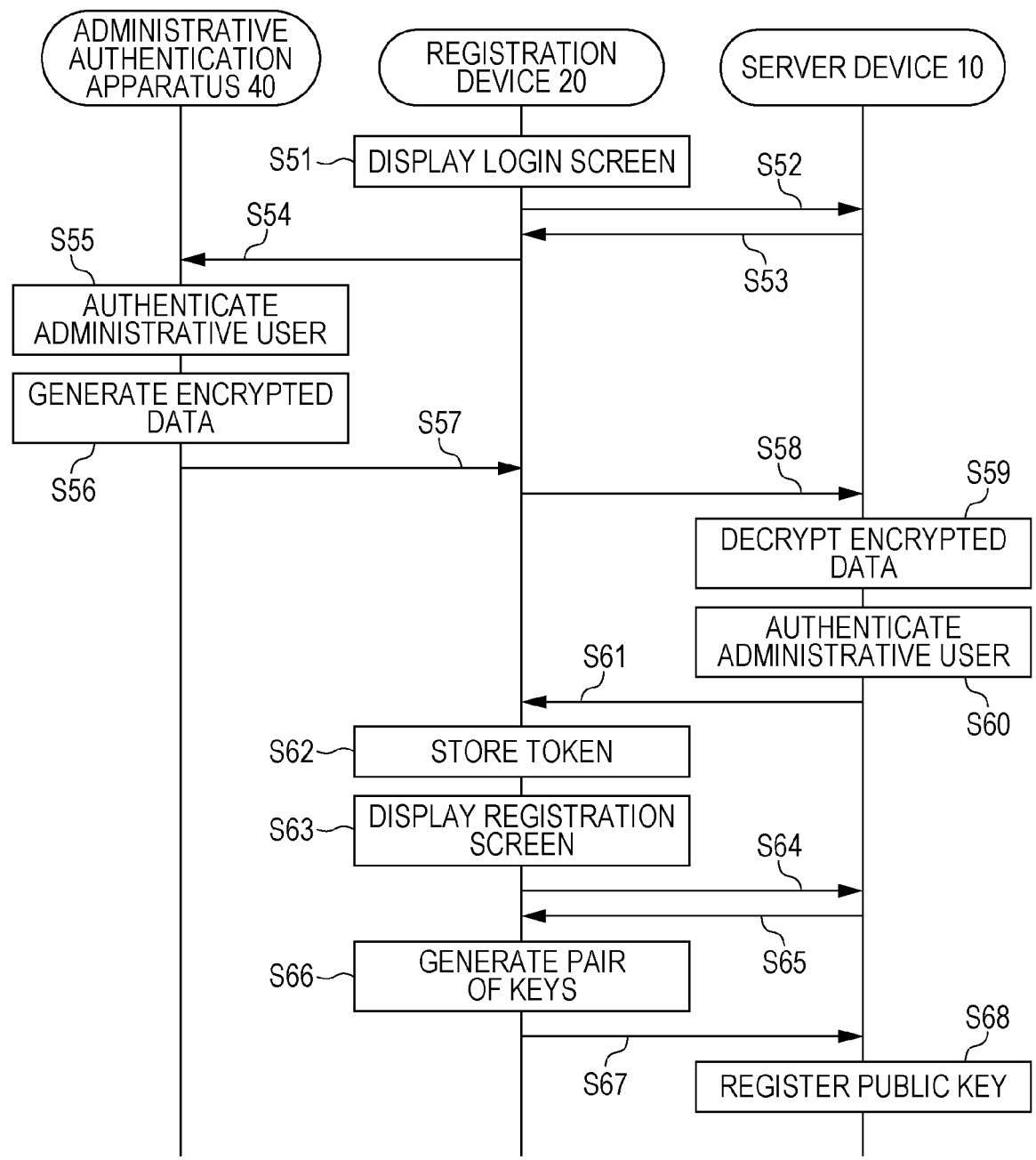
FIG. 10 illustrates an example of an operation procedure in processing for registering a registration device.

FIG. 10 illustrates an example of an operation procedure in processing for registering the registration device 20. This operation procedure is performed by the registration device 20, the administrative authentication apparatus 40, and the server device 10. In this operation procedure, steps S51 to S62, which are identical to steps S31 to S42 except for that the administrative user terminal 30 (the I/F unit 301) illustrated in FIG. 9 is replaced with the registration device 20 (the I/F unit 201), are performed. That is, the administrative user is authenticated by the authentication apparatus of the administrative user, and a token is stored in the registration device 20 (the I/F unit 201).

Next, the registration device 20 (the I/F unit 201) displays a screen for entry of a tenant name of a tenant to which the logged-in administrative user belongs as a registration screen for registering an authentication function of the registration device 20 (step S63). Next, the registration device 20 (the I/F unit 201) transmits the tenant name entered on the registration screen and the stored token to the server device 10 (step S64). Upon receipt of the tenant name and the token, the server device 10 (the registration unit 102) transmits key request data requesting a public key of an authentication apparatus of the registration device 20 to the registration device 20 (step S65).

The registration device 20 (the authentication processing unit 202, the registration processing unit 203) generates a pair of encryption key and public key in response to the request indicated by the transmitted key request data (step S66). The registration device 20 (the authentication processing unit 202) stores therein the generated encryption key in association with the identification information of the server device 10 and the user ID of the administrative user. Next, the registration device 20 (the registration processing unit 203) transmits the generated public key to the server device 10 (step S67).

By storing the transmitted public key in association with the user ID of the administrative user and the tenant name, the server device 10 (the registration unit 102) registers the public key and the authentication function of the registration device 20 (step S68). As described above, the server device 10 authenticates the administrative user and registers the authentication function of the registration device 20 when authentication using the administrative authentication apparatus 40 is requested through the registration device 20.

Figure 11:
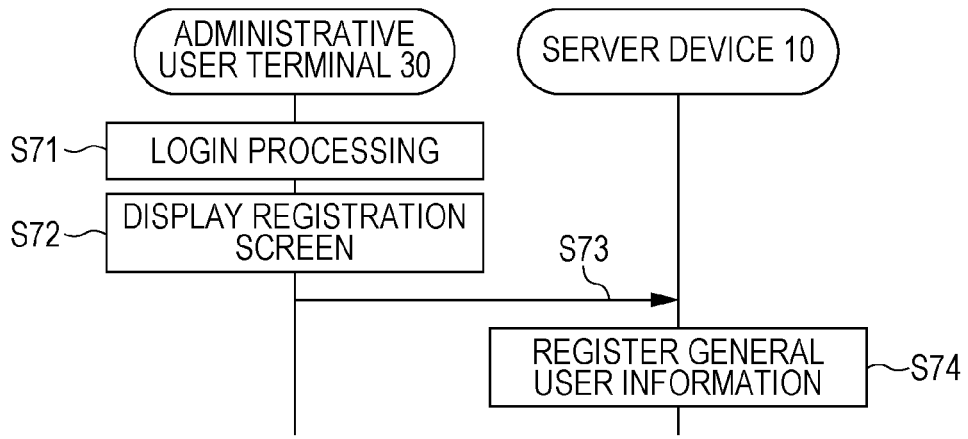
FIG. 11 illustrates an example of an operation procedure in processing for registering a general user.

FIG. 11 illustrates an example of an operation procedure in processing for registering the general user. This operation procedure is performed by the administrative user terminal 30 and the server device 10. First, the administrative user terminal 30 (the I/F unit 301) performs the login processing for login of the administrative user (step S71). For example, operation illustrated in FIG. 9 is performed in the login processing, but description thereof is omitted. Next, the administrative user terminal 30 (the I/F unit 301) displays a registration screen for registering the general user (step S72).

Next, the administrative user terminal 30 (the I/F unit 301) transmits general user information entered on the registration screen to the server device 10 (step S73). The general user information is, for example, a user name and a password. The server device 10 (the registration unit 102) registers the general user by storing therein the transmitted general user information (step S74).

Figure 12:
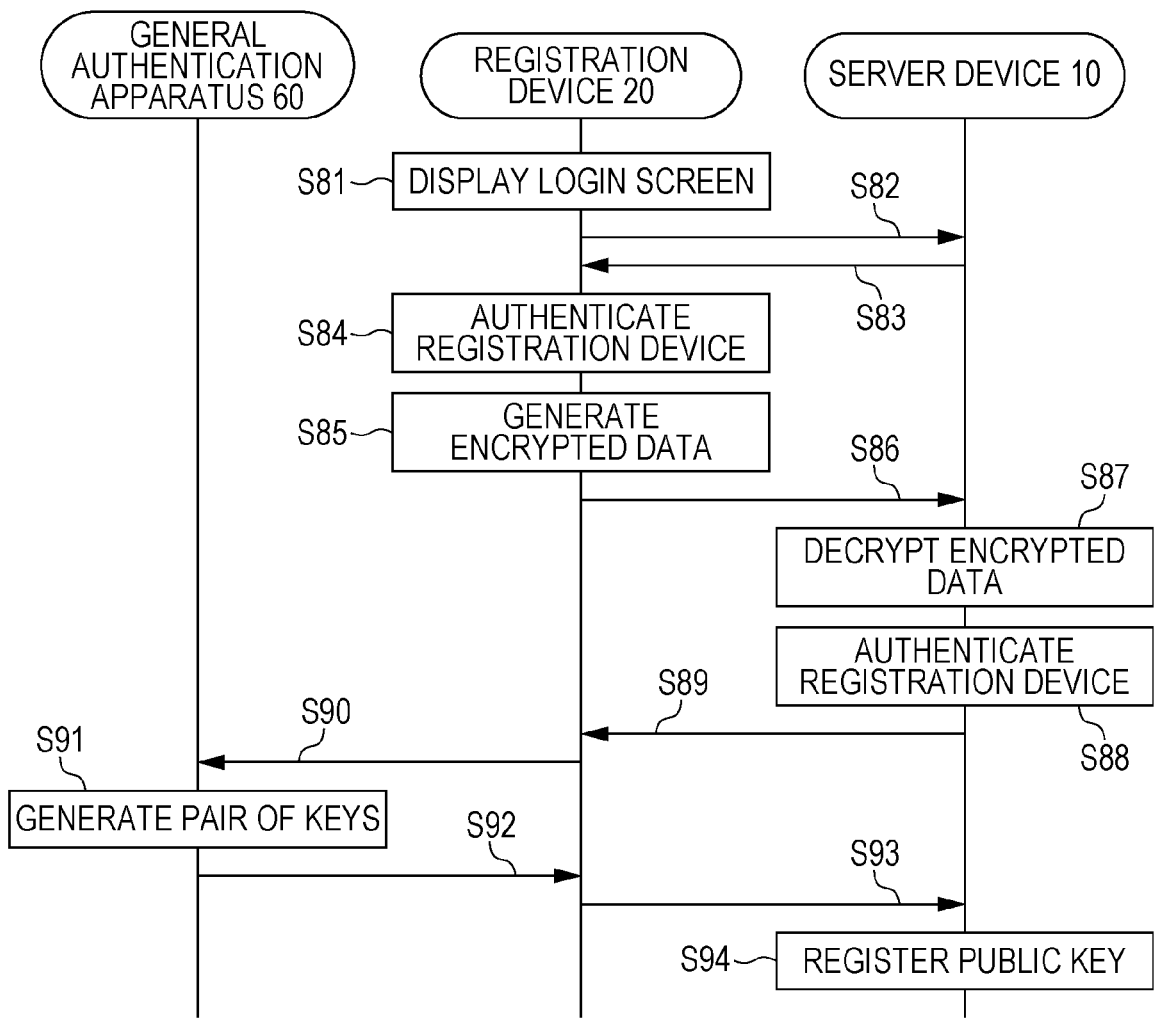
FIG. 12 illustrates an example of an operation procedure in processing for registering a general authentication apparatus.

FIG. 12 illustrates an example of an operation procedure in processing for registering the general authentication apparatus 60. This operation procedure is performed by the registration device 20, the general authentication apparatus 60, and the server device 10. First, the registration device 20 (the I/F unit 201) displays a screen for entry of the user name and the password of the administrative user as a login screen for login of the administrative user (step S81).

Next, the registration device 20 (the I/F unit 201) transmits the user name and the password entered on the registration screen to the server device 10 (step S82). In a case where the transmitted user name and password have been registered, the server device 10 (the authentication unit 101) authenticates the administrative user and transmits authentication request data requesting authentication from an authentication apparatus of the registration device 20 to the registration device 20 (step S83). This authentication request data includes a code that will be encrypted later.

In response to the request indicated by the transmitted authentication request data, the registration device 20 (the I/F unit 201) authenticates the registration device 20 by using the authentication function thereof (step S84). This authentication is internal processing in the registration device 20 and does not need a user's operation in particular. Next, the registration device 20 (the authentication processing unit 202) generates encrypted data by encrypting the code indicated by the authentication request data by using the encryption key stored therein (step S85).

The registration device 20 (the authentication processing unit 202) transmits the generated encrypted data to the server device 10 (step S86). The server device 10 (the authentication unit 101) decrypts the transmitted encrypted data by using the public key of the registration device 20 registered in the registration processing illustrated in FIG. 10 (step S87). In a case where the encrypted data is successively decrypted into the code, the server device 10 (the authentication unit 101) authenticates the registration device 20 (step S88). In a case where the encrypted data cannot be decrypted into the code, the server device 10 (the authentication unit 101) finishes this operation procedure without authenticating the registration device 20.

Next, the server device 10 (the registration unit 102) transmits key request data requesting a public key of an authentication apparatus of the general authentication apparatus 60 to the registration device 20 (step S89). The registration device 20 (the I/F unit 201) transfers the transmitted key request data to the general authentication apparatus 60 (step S90). In response to the request indicated by the transmitted key request data, the general authentication apparatus 60 (the authentication processing unit 601, the registration processing unit 602) generates a pair of encryption key and public key (step S91).

The general authentication apparatus 60 (the authentication processing unit 601) stores therein the generated encryption key in association with the identification information of the server device 10 and the user ID of the administrative user. Next, the general authentication apparatus 60 (the registration processing unit 602) transmits the generated public key to the registration device 20 (step S92). The registration device 20 (the I/F unit 201) transfers the transmitted public key to the server device 10 (step S93).

The server device 10 (the registration unit 102) registers the public key and the authentication function of the general authentication apparatus 60 by storing therein the transmitted public key in association with the user ID of the administrative user (step S94). As described above, when registration of the authentication function of the general authentication apparatus 60 is requested through the registration device 20, the server device 10 registers the authentication function of the general authentication apparatus 60 in a case where the authentication function of the registration device 20 has been registered.

Figure 13:
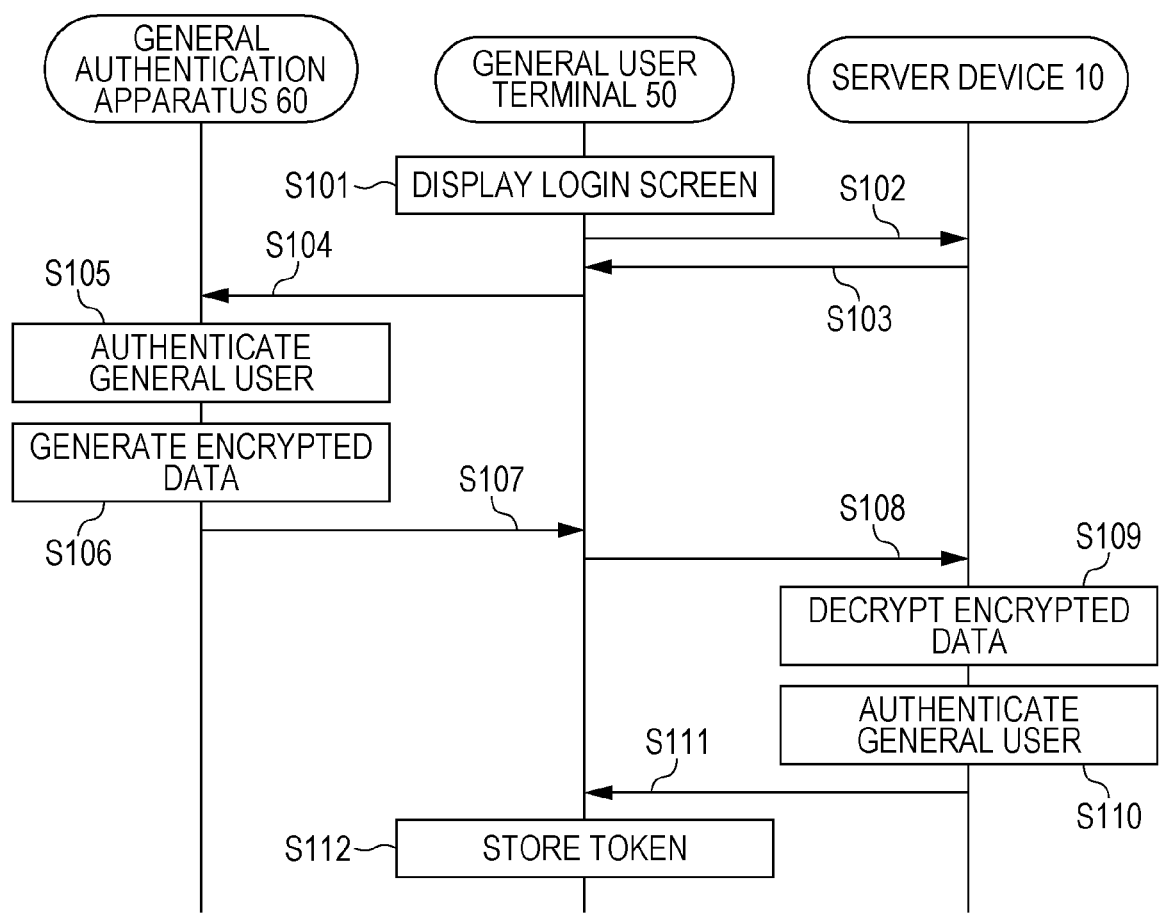
FIG. 13 illustrates an example of an operation procedure in login processing of the general user.

FIG. 13 illustrates an example of an operation procedure in login processing of the general user. This operation procedure is performed by the general user terminal 50, the general authentication apparatus 60, and the server device 10. In this operation procedure, steps S101 to S112, which are identical to steps S31 to S42 except for that the administrative user terminal 30 (the I/F unit 301) illustrated in FIG. 9 is replaced with the general user terminal 50 (the I/F unit 501) and the administrative authentication apparatus 40 is replaced with the general authentication apparatus 60, are performed. As a result, the general user is authenticated by the authentication apparatus of the general user, and a token is stored in the general user terminal 50 (the I/F unit 501).

As described above, when authentication using the general authentication apparatus 60 is requested, the server device 10 authenticates the general user in a case where the authentication function of the general authentication apparatus 60 has been registered. In the present exemplary embodiment, each of the above authentication functions generates an encryption key and a public key. The server device 10 registers an authentication function by storing a public key therein. The encryption key is an example of an "encrypting key" of the present disclosure, and the public key is an example of a "decrypting key" of the present disclosure.

In the registration processing illustrated in FIG. 8, the registration unit 102 of the server device 10 registers the authentication function of the administrative authentication apparatus 40 having the authentication function of authenticating the administrative user on the basis of an operation of the administrative user. The registration unit 102 in this case is an example of a "first registration unit" of the present disclosure. Furthermore, in the registration processing illustrated in FIG. 10, the registration unit 102 of the server device 10 authenticates the administrative user and registers the authentication function of the administrative authentication apparatus 40 when authentication using the administrative authentication apparatus 40 is requested through the registration device 20 having the authentication function of authenticating the registration device 20. The registration unit 102 in this case is an example of a "second registration unit" of the present disclosure.

Furthermore, in the registration processing illustrated in FIG. 12, when registration of the authentication function of the general authentication apparatus 60 having the authentication function of authenticating the general user is requested through the registration device 20, the registration unit 102 of the server device 10 registers the authentication function of the general authentication apparatus 60 in a case where the authentication function of the registration device 20 has been registered. That is, the registration unit 102 does not register the authentication function of the general authentication apparatus 60 in a case where the authentication function of the registration device 20 has not been registered. The registration unit 102 in this case is an example of a "third registration unit" of the present disclosure.

The authentication unit 101 of the server device 10 performs authentication using a registered authentication function. For example, when authentication using the general authentication apparatus 60 is requested, the authentication unit 101 authenticates the general user in a case where the authentication function of the general authentication apparatus 60 has been registered. The authentication unit 101 is an example of an "authentication unit" of the present disclosure.

In the authentication registration support system 1, the authentication function of the general authentication apparatus 60 is not registered in a case where the authentication function of the registration device 20 has not been registered, even if registration of the authentication function of the general authentication apparatus 60 is requested through the registration device 20, as described above. As described above, according to the present exemplary embodiment, registration of the general authentication apparatus 60, which is a terminal for authentication, in the server device 10 is restricted to a case where the registration is performed through the registration device 20 whose authentication function has been registered.

In the present exemplary embodiment, by registering a public key, an authentication function of an authentication apparatus (e.g., the administrative authentication apparatus 40) that generated the public key together with an encryption key is registered. In a case where authentication using an authentication apparatus is performed, the server device 10 may unconditionally accept the authentication as long as the authentication is successfully completed on the authentication apparatus side. However, completing authentication not only in a case where data encrypted by the authentication apparatus has been successfully decrypted by using a registered public key, a security level of the authentication using the authentication apparatus is improved as compared with a case where authentication is completed only on the authentication apparatus side.

[2] Modifications

The above exemplary embodiment is merely an example of the present disclosure and may be modified as follows. Furthermore, the exemplary embodiment and the modifications may be combined as needed.
[2-1] Registration of Authentication Function Although the server device 10 (the registration unit 102) registers a public key and thus registers an authentication function of an authentication apparatus that generated the public key in the above exemplary embodiment, the authentication function may be registered by registering not the public key but an encryption key. In this case, for example, the following operation is performed in the login processing illustrated in FIG. 9.

In step S33, the server device 10 (the authentication unit 101) transmits authentication request data requesting authentication from the authentication apparatus of the authenticated administrative user and including a code encrypted by the registered encryption key to the administrative user terminal 30. In step S36, the administrative authentication apparatus 40 (the authentication processing unit 401) decrypts the encrypted code indicated by the authentication request data by using a public key stored therein.

In step S37, the administrative authentication apparatus 40 (the authentication processing unit 401) transmits the decrypted code to the administrative user terminal 30. In step S38, the administrative user terminal 30 (the I/F unit 301) transfers the transmitted code to the server device 10. The server device 10 (the authentication unit 101) does not perform the decrypting in step S39 and authenticates the administrative user in step S40 in a case where a code identical to the code included in the authentication request data is received. Also in this case, a security level of authentication using the authentication apparatus is improved as compared with a case where authentication is performed only on an authentication apparatus side, as in the exemplary embodiment.
[2-2] Login Processing of Administrative User Although the administrative authentication apparatus 40 is registered by the registration processing illustrated in FIG. 8 and the administrative user cannot log in without the registered administrative authentication apparatus 40 in the login processing of the administrative user illustrated in FIG. 9 in the exemplary embodiment, registration of the administrative authentication apparatus 40 may be omitted.

In this case, the registration processing illustrated in FIG. 8, the processes in steps S33 to S39 illustrated in FIG. 9, and the processes in steps S53 to S59 (the authentication processing using the administrative authentication apparatus 40) are unnecessary. Also in this modification, authentication using the user name and the password of the administrative user entered in steps S32 and S52 is performed, and therefore the registration device 20 is registered only in the presence of the administrative user.
[2-3] Functional Configuration A method for realizing the functions illustrated in FIG. 6 in the authentication registration support system 1 is not limited to the method described in the exemplary embodiment. For example, the server device 10 may include all of the constituent elements in a single housing or may include the constituent elements separately in two or more housings, as in the case of computer resources provided in a cloud service.

Furthermore, for example, the I/F units of the respective devices display various kinds of interface screens, and each of the interface screens may be provided with a function. Furthermore, for example, the operation performed by the authentication processing unit 202 and the registration processing unit 203 may be performed by a single function. In short, configurations of the devices that realize the functions and a range of operation performed by each function may be freely decided as long as the functions illustrated in FIG. 6 are realized by the authentication registration support system as a whole.
[2-4] Processor In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

[2-5] Category of Disclosure

The present disclosure can be grasped as a display device, an imaging device, an image processing device, and a display system including these devices. Furthermore, the present disclosure can be grasped as an information processing method for realizing processing performed by the devices and as a program for causing a computer that controls the devices to function. This program may be offered as a recording medium such as an optical disc in which the program is stored or may be downloaded and installed into a computer over a communication line such as the Internet.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a first authentication terminal that has an authentication function of authenticating a first user;
a second authentication terminal that has an authentication function of authenticating a second user;
a registration device that has an authentication function of authenticating the registration device; and
an authentication server that performs authentication using a registered authentication function,
wherein
the authentication server registers the authentication function of the first authentication terminal on a basis of an operation of the first user,
when authentication using the first authentication terminal is requested through the registration device, the authentication server authenticates the first user and registers the authentication function of the registration device,
when registration of the authentication function of the second authentication terminal is requested through the registration device, the authentication server registers the authentication function of the second authentication terminal in a case where the authentication function of the registration device has been registered, and
when authentication using the second authentication terminal is requested, the authentication server authenticates the second user in a case where the authentication function of the second authentication terminal has been registered.

2. The information processing system according to claim 1, wherein
each of the authentication functions generates an encrypting key and a decrypting key; and
the authentication server registers the authentication function by storing therein the encrypting key or the decrypting key.

3. An information processing apparatus comprising:
a processor configured to:
register an authentication function of a first authentication terminal on a basis of an operation of the first user, the authentication function of the first authentication terminal being a function of authenticating a first user;
register an authentication function of a registration device by authenticating the first user when authentication using the first authentication terminal is requested through the registration device, the authentication function of the registration device being a function of authenticating the registration device;
register an authentication function of a second authentication terminal in a case where the authentication function of the registration device has been registered when registration of the authentication function of the second authentication terminal is requested through the registration device, the authentication function of the second authentication terminal being a function of authenticating a second user; and
perform authentication using a registered authentication function,
wherein when authentication using the second authentication terminal is requested, the processor authenticates the second user in a case where the authentication function of the second authentication terminal has been registered.

4. A non-transitory computer readable medium storing a program causing a computer to execute a process for information processing, the process comprising:
registering an authentication function of a first authentication terminal on a basis of an operation of the first user, the authentication function of the first authentication terminal being a function of authenticating a first user;
registering an authentication function of a registration device by authenticating the first user when authentication using the first authentication terminal is requested through the registration device, the authentication function of the registration device being a function of authenticating the registration device;
registering an authentication function of a second authentication terminal in a case where the authentication function of the registration device has been registered when registration of the authentication function of the second authentication terminal is requested through the registration device, the authentication function of the second authentication terminal being a function of authenticating a second user; and
when authentication using the second authentication terminal is requested, the authentication being authentication using a registered authentication function, in a case where the authentication function of the second authentication terminal has been registered, authenticating the second user.

* * * * *